United States Patent [19]
Pirooz

[11] 3,854,919
[45] Dec. 17, 1974

[54] METHOD OF FORMING TRANSPARENT GLASS CERAMIC WITH COMPRESSION LAYER

[75] Inventor: Perry P. Pirooz, Toledo, Ohio

[73] Assignee: Owens-Illinois, Inc., Toledo, Ohio

[22] Filed: Mar. 1, 1973

[21] Appl. No.: 337,223

Related U.S. Application Data

[63] Continuation-in-part of Ser. No. 165,744, July 23, 1971, Pat. No. 3,779,856.

[52] U.S. Cl............................. 65/32, 65/33, 65/134, 106/39.7, 106/52
[51] Int. Cl.............................................. C03b 29/00
[58] Field of Search......... 65/32, 33, 134; 106/39.7, 106/52

[56] References Cited
UNITED STATES PATENTS

| | | | |
|---|---|---|---|
| 3,420,645 | 1/1969 | Hair | 65/32 X |
| 3,464,806 | 9/1969 | Seki et al. | 65/33 |
| 3,490,887 | 1/1970 | Herczog | 65/32 X |
| 3,557,576 | 1/1971 | Baum | 65/32 X |
| 3,639,113 | 2/1972 | Aslanova et al. | 65/32 |
| 3,756,798 | 9/1973 | Ernsberger | 65/33 |
| 3,790,360 | 1/1974 | Kato et al. | 65/32 |
| 3,802,892 | 4/1974 | Pirooz | 65/33 X |

*Primary Examiner*—S. Leon Bashore
*Assistant Examiner*—Frank W. Miga
*Attorney, Agent, or Firm*—Charles S. Lynch; E. J. Holler

[57] ABSTRACT

High-strength glass-ceramics and a method of producing glass-ceramics having high strengths and good thermal shock resistance wherein a thermally crystallizable glass containing a nucleating agent capable of changing valency and which is more effective in the changed valency state is thermally in situ crystallized in a reducing atmosphere to form an at least partially crystalline glass-ceramic having a coefficient of thermal expansion which is considerably lower than that of the parent glass and having a high compressive stress layer on its surface.

11 Claims, No Drawings

METHOD OF FORMING TRANSPARENT GLASS CERAMIC WITH COMPRESSION LAYER

This application is a continuation-in-part of Ser. No. 165,744, filed July 23, 1971 and now U.S. Pat. No. 3,779,856, issued Dec. 18, 1973.

Various methods for producing high strength glass and glass-ceramic articles are known in the art wherein a compressive stress layer is formed on the surface of the article. The oldest of these methods is referred to as thermal tempering and is based on the quenching of the glass surface. Another method is that known as ion exchange wherein large ions on the surface of the glass are exchanged for smaller ones, usually by contacting the glass surface with a sale solution or melt of the ions to be exchanged and maintaining such contact for the period of time necessary for the exchange to be complete and a compressive stress layer of the desired depth produced. Such depths in commercial glass-ceramics are usually less than 90 microns in thickness and more usually are about 20 to 50 microns in thickness. Still another method involves the cladding of a glass surface with another glass which is capable of forming a low-expansion crystalline phase and then heat treating the latter glass. Also, the incorporation of fluorine into certain glasses to form high-strength glass-ceramics therefrom by thermal in situ crystallization is known. Each of these known methods has certain disadvantages in that they can be utilized only with glasses of certain compositions or they require additional process steps which add materially to the final cost of the article produced thereby.

The present invention for forming a compressive stress layer on the surface of a glass-ceramic differs from the prior art methods in that a thermally crystallizable glass capable of being thermally in situ crystallized to a glass-ceramic having a coefficient of thermal expansion which is considerably less than that of the parent glass, preferably a difference of at least 20 × $10^{-7}$/°C. (0°–300°C.) or more, wherein the parent glass contains a nucleating agent which can have its valency changed and such changed valency state is the more effective state for nucleating the glass, is subjected to a nucleating temperature while held in a reducing atmosphere for a time sufficient for the nucleation to be substantially complete. The reducing atmosphere in contact with the surface of the glass reduces the valency of the nucleating agent at and just below the surface of the glass resulting in an increased rate of nucleation along that portion of the glass where such reduced nucleating agent is present. When subsequently crystallized, the degree of crystallinity is greater at the surface than in the interior of the article and this differential crystallization produces a compressive stress layer on the glass-ceramic surface. The depth of the layer is dependent on the difference in nucleation and the extent of that difference inwardly from the surface.

The change in valency of the nucleating agent can be enhanced if there is present in the glass an oxide of a metal which will promote the reduction of the nucleating agent when in contact with the reducing atmosphere. Oxides of copper, iron, and manganese are examples of compounds which assist in promoting the reduction of the nucleating agent.

The preferred nucleating agents for thermally crystallizable glasses which can be thermally in situ crystallized to a glass-ceramic having a much lower coefficient of thermal expansion are $TiO_2$, $ZrO_2$ and mixtures thereof. These oxides are most effective as nucleation agents under reducing conditions.

In one embodiment of the invention it has been found that glasses of the $Li_2O$-$Al_2O_3$-$SiO_2$ system which can be thermally in situ crystallized to low expansion, transparent, high quartz solid solution glass-ceramics and which contain a nucleating agent and CuO, can be significantly strengthened by the process of this invention. The increase in flexural strength is due to the formation of a surface compressive layer which is the result of differential crystallization of the surface versus the interior of the article. Thermally crystallizable glass systems, such as $MgO$-$Al_2O_3$-$SiO_2$ and $Na_2O$-$Al_2O_3$-$SiO_2$ systems, wherein the resulting glass-ceramics have a higher coefficient of thermal expansion than the present glass are not suitable for the purpose of this invention.

Thermally crystallizable glasses suitable for producing transparent glass-ceramics having high flexural strengths of from about 30,000 psi to about 80,000 psi and more, having resistance to thermal shock and having good chemical durability are those wherein the essential ingredients are within the following ranges:

| Ingredient | Weight Percent |
|---|---|
| $SiO_2$ | 54 – 76 |
| $Al_2O_3$ | 18 – 33 |
| $Li_2O$ | 2.0 – 6.4 |
| Nucleating Agent | 3 – 8 |
| CuO | 0.5 – 6 | wherein the nucleating agent is selected from the group consisting of $TiO_2$, $ZrO_2$ and mixtures thereof, and the molar ratio of $SiO_2$ to $Al_2O_3$ is from 3 to 6, and the molar ratio of $Li_2O$ to $Al_2O_3$ is from 0.3 to about 0.9. When $TiO_2$ or $ZrO_2$ is used as the sole nucleating agent, it is present in an amount of 3 to 6 weight percent. Use of more than about 6 weight percent or of more than about 8 weight percent of the mixture does not materially improve the crystallization process and, besides adding to the cost of the final product, may have some deleterious effects. For example, an excess of $ZrO_2$ increases the liquidus temperature of the glass and makes the glass more difficult to work. An excess of $TiO_2$ will increase the expansion coefficient of the resulting glass-ceramics, which defeats the purpose of the present invention, namely to have as much of a difference between the thermal expansion properties of the glass-ceramics and the present glass as possible in order to obtain the greatest compressive stress layer formed on the surface of the glass-ceramic.

The essential ingredients listed above must be present in an amount of at least about 90 percent by weight of the composition and preferably at least 95 percent by weight of the composition. Other metal oxides can be present in minor amounts, either singly or as mixtures provided that such oxides are compatible with the $Li_2O$-$Al_2O_3$-$SiO_2$-CuO systems and do not adversely affect the desired properties in the final products. Examples of such other metal oxides are $Na_2O$, $K_2O$, CaO, BaO, ZnO, $SnO_2$, PbO, MgO, and the like. In the foregoing compositions iron oxide, expressed as $Fe_2O_3$ can be substituted for copper oxide, but as will be shown later, the resulting strengths and depths of the stress layer are usually not as good as when using copper oxide.

While the foregoing defines the compositions broadly, in its preferred embodiment the glass-ceramic of the invention has the following composition, with these ingredients coming within the following ranges:

| Ingredients | Weight Percent |
|---|---|
| $SiO_2$ | 57 – 69 |
| $Al_2O_3$ | 20 – 31 |
| $Li_2O$ | 3 – 6 |
| Nucleating Agent | 3 – 8 |
| CuO | 1 – 5 | wherein the nucleating agent is as defined above, the $SiO_2/Al_2O_3$ molar ratio is from 3.2 to 5.5, and the $Li_2O/Al_2O_3$ molar ratio is from 0.4 to about 0.8. Again, the essential ingredients form at least about 90 percent by weight and preferably at least 95 percent by weight of the compositions.

When the $SiO_2/Al_2O_3$ molar ratio is in excess of about 6, the resulting glass is too viscous to be worked properly by commercial glass-forming methods. When the molar ratio is less than 3, the glass becomes too fluid and unstable and readily undergoes uncontrolled devitrification.

When the nucleating agent is a mixture of $TiO_2$ and $ZrO_2$ excellent results are obtained when these ingredients are present in a 1:1 molar ratio.

In forming the high strength glass-ceramics within the scope of the present invention, glass compositions 1–7 were formed from the following batch melts:

TABLE I

| | Parts by Weight | | | | | | |
|---|---|---|---|---|---|---|---|
| | | | | Compositions | | | |
| Ingredients | 1 | 2 | 3 | 4 | 5 | 6 | 7 |
| Ottawa Flint Sand | 2842 | 3009 | 3060 | 2656 | 3133 | 3132 | 2809 |
| Alcoa Alumina A-10 | 1322 | 1332 | 1338 | 1277 | 1056 | 1056 | 1535 |
| Lithium Carbonate | 489 | 590 | 525 | 437 | 354 | 357 | 696 |
| Lithium Zirconate | — | — | 143 | — | — | — | — |
| Titanox | 70 | 69 | 70 | 70 | 91 | 91 | 91 |
| Soda Ash | 169 | 168 | 86 | 167 | — | — | — |
| Glass Frit* | 430 | 162 | — | 430 | 417 | 418 | — |
| Florida Zircon | — | — | — | — | — | — | 151 |
| Cupric Oxide | 50 | 100 | 150 | 300 | 75 | 175 | 150 |
| High Calcium Lime | — | — | — | — | 180 | — | — |
| Melting Temperature (°C) | 1590 | 1590 | 1590 | 1590 | 1620 | 1590 | 1620 |
| Melting Times (Hours) | 47 | 23 | 22 | 37.5 | 24 | overnight | 25.5 |

*Glass Frit consisted of, by weight, 24.41% $ZrO_2$, 64.22% $SiO_2$ and 11.38% $Li_2O$.

Each of the melts was made in a platinum crucible and was stirred continuously with a platinum stirrer at the melting temperatures and for the times indicated above. At the completion of the melting time, a plurality of glass rods having a diameter of one-fourth inch were drawn from each melt and were air cooled.

Upon analysis, the glasses were found to have the following indicated compositions, expressed in weight percent:

TABLE II

| | Compositions | | | | | | |
|---|---|---|---|---|---|---|---|
| Ingredients | 1 | 2 | 3 | 4 | 5 | 6 | 7 |
| $SiO_2$ | 62.2 | 61.1 | 61.1 | 58.7 | 67.9 | 67.9 | 57.2 |
| $Al_2O_3$ | 26.4 | 26.7 | 26.6 | 26.1 | 21.0 | 21.1 | 30.9 |
| $Li_2O$ | 4.9 | 4.7 | 4.7 | 4.5 | 3.8 | 3.8 | 5.6 |
| $Na_2O$ | 2.0 | 1.7 | 1.0 | 1.8 | — | — | — |
| $TiO_2$ | 1.4 | 1.4 | 1.4 | 1.4 | 1.8 | 1.8 | 1.8 |
| $ZrO_2$ | 2.1 | 2.3 | 2.1 | 2.2 | 2.0 | 2.0 | 2.1 |
| CuO | 1.0 | 0.56 | 3.0 | 0.9 | 1.5 | 3.4 | 0.5 |
| $Cu_2O$ | —* | 1.24 | —* | 4.2 | —* | —* | 1.9 |
| CaO | — | — | — | — | 2.0 | — | — |
| $Fe_2O_3$ | — | — | — | — | — | 0.04 | — |
| Molar Ratio $Li_2O/Al_2O_3$ | 0.62 | 0.62 | 0.62 | 0.62 | 0.62 | 0.62 | 0.62 |
| Molar Ratio $SiO_2/Al_2O_3$ | 4.0 | 3.9 | 3.9 | 3.9 | 5.5 | 5.5 | 3.2 |
| Coeff. Thermal Expansion $\times 10^{-7}$ (0 – 300°C.) | 50.5 | 48.6 | 45.1 | 48.7 | 39.2 | 31.7 | 45.1 |

*Not analyzed for $Cu_2O$. CuO is total copper oxide expressed as CuO.

Each glass was placed in an electric furnace which had been heated to 400° C. The furnace was then purged for 15 minutes with forming gas consisting of 90 percent nitrogen and 10 percent hydrogen, by volume. Each glass was then heated to the desired nucleating and crystallization temperature at a particular heating rate, held there for the desired time and finally cooled to room temperature at the normal furnace rate.

The heat treatment schedules and the physical property measurements for each of the glasses are set forth in the following table:

TABLE III

| Comp. No. | HEAT-TREATMENT CONDITIONS | | | | PROPERTIES | | |
|---|---|---|---|---|---|---|---|
| | Heating Rate (°C/hr) | Holding Temp. °C. | Time (hrs) | Forming Gas or Air | $\alpha \times 10^7$ (0–300°C) | Comp. Stress psi $\times 10^{-3}$ | Depth ($\mu$m) |
| 1 | 320 | 800 | 4 | F.G. | −1.8 | 49.6 | 170 |
| 1 | 320 | 800 | 16 | F.G. | −3.9 | 28.5 | 200 |
| 1 | max.* | 800 | 16 | air | −2.8 | —** | — |
| 2 | 320 | 800 | 4 | F.G. | −2.7 | 35.8 | 140 |
| 2 | 320 | 775 | 8 | F.G. | −1.7 | 53.0 | 203 |
| 2 | 320 | 775 | 16 | F.G. | −3.1 | 21.0 | 360 |
| 2 | 320 | 775 | 0 | F.G. | 43.2 | 48.0 | 100 |
| 3 | 320 | 775 | 2 | F.G. | −4.7 | 72.0 | 224 |
| 3 | 320 | 775 | 4 | F.G. | −6.1 | 45.0 | 200 |
| 3 | 320 | 800 | 2 | F.G. | −7.1 | 35.0 | 168 |
| 3 | 320 | 750 | 16 | F.G. | −7.7 | 59.0 | 375 |
| 5 | 320 | 825 | 2 | F.G. | −3.4 | 38.0 | 185 |
| 6 | max. | 800 | 2 | F.G. | −4.7 | 56.0 | 196 |
| 6 | 320 | 800 | 2 | F.G. | −10.2 | 26.0 | 190 |
| 6 | max. | 800 | 4 | F.G. | −11.8 | 40.0 | 224 |
| 6 | max. | 850 | 4 | F.G. | −10.4 | 58.0 | 207 |
| 6 | 320 | 775 | 8 | F.G. | −9.4 | 52.7 | 336 |
| 6 | 320 | 775 | 16 | F.G. | −10.6 | 32.0 | 224 |
| 6 | 320 | 775 | 24 | F.G. | −10.3 | 36.7 | 290 |
| 6 | 320 | 775 | 4 | F.G. | −1.4 | 46.0 | 324 |
| 7 | 320 | 775 | 4 | F.G. | −2.9 | 36.0 | 195 |
| 7 | 320 | 775 | 8 | F.G. | −6.0 | 20.0 | 140 |
| 7 | 320 | 775 | 16 | F.G. | −8.8 | 31.0 | 168 |
| 7 | 320 | 775 | 24 | F.G. | −9.4 | 42.8 | 250 |

*"max" means that the furnace was first heated to the holding temperature and the glass then placed therein at that temperature and held for the indicated holding time.
** no compression stress layer was formed.

Composition No. 4 was heat treated by holding one hour at 775°C. in an atmosphere of H₂O to form the compressive layer. The abraded modulus of rupture was 26,500 psi (average of 5 samples).

From the data in Table III, it can be seen that one weight percent CuO in a thermally crystallizable glass will produce a compressive stress layer on the surface when given the proper heat treatment and that the results which are obtained are sensitive to such heat treatment. While from about 0.5 to about 6% CuO can be present in the $Li_2O-Al_2O_3-SiO_2$, glasses, it is preferable to have the CuO content be from about 1 to about 3.5 percent. Optimum results can be obtained when the amount of CuO is about 3 percent by weight.

Compressive stresses of from about 20,000 or 30,000 psi up to 80,000 psi and more can be obtained by the process of this invention in compositions containing copper oxide. Preferably stresses of about 50,000 to 80,000 psi or more can be imparted to the transparent glass-ceramics of the invention by appropriate adjustment of the compositions, the heating times, and the heating temperatures.

While the glass ceramics which are formed are transparent, it is to be understood that when the ceramic is of substantial thickness, some haziness or cloudiness may appear, due to the light scattering which occurs, so that instead of being truly transparent, like window glass, the glass-ceramic may be somewhat translucent in appearance.

Also from the data in Table III, it can be seen that with each composition the amount of compressive stress formed on the glass-ceramic surface, the depth of the layer, and the coefficient of thermal expansion can be controlled by varying the temperature, the time, or the heating rate. However, when the glasses were crystallized in air, no compression layer formed on the surface. Note also that the glasses of the invention initially crystallize on the surface, and if the heat treatment is stopped at this point the product is essentially a relatively high expansion glass, with a low expansion compressive layer on the surface (see the last heat treatment of composition No. 2).

While the reducing atmosphere utilized in producing the high-strength glass-ceramics of the invention exemplified in Table III was forming gas, which is readily available commercially and consists of 90 percent nitrogen and 10 percent hydrogen by volume, other reducing atmosphere can be utilized for the purpose of the invention. Thus mixtures of nitrogen and hydrogen in different proportions, carbon monoxide, steam, natural gas, and the like, or mixtures of two or more of such gases can be used.

For example, two glasses of Composition No. 2 were heated in an atmosphere of steam at a heat-up rate of 320°C./hour until the holding temperature of 775°C. and 800°C., respectively, were reached, and then held at such temperature for 1 hour and cooled to room temperature at furnace rate. The moduli of rupture for the glass-ceramics were 46,800 psi and 63,000 psi, respectively.

Modulus of rupture tests were conducted on two of the glasses of Table III to show that glass-ceramics having high compressive stress layers also have high moduli of rupture, and the results are set forth below in Table IV.

TABLE IV

| Comp. No. | Heat Treatment Temp. °C.(hrs) | Forming Gas or Air | M. O. R. $\times 10^{-3}$ | Abraded |
|---|---|---|---|---|
| 6 | not heat treated | — | 17.2 | no |
| 6 | not heat treated | — | 10.3 | yes |
| 6 | 825(1) | F.G. | 64.7 | no |
| 6 | 825(1) | F.G. | 56.9 | yes |
| 6 | 875(1) | F.G. | 69.5 | no |
| 6 | 740(16)+850(1) | air | 10.4 | no |
| 3 | 775(2) | F.G. | 74.5 | no |
| 3 | 775(2) | F.G. | 56.5 | yes |

All samples in Table IV were heated at a heat-up rate of 320° C./hour to the indicated holding temperatures and held for the indicated times. They were then cooled to ambient temperature at the furnace rate. All modulus of rupture measurements were made on 5 × 0.2 inch cane samples which were either abraded or unabraded, using either the Instron or the Tinius-Olsen measuring instruments. Each value set forth in Table IV is based on the average of five samples with the exception of the composition heat treated in air which is based upon seven samples. Abrasion was performed by placing the rods in a ball mill containing 240 grit and milling for 15 minutes.

Iron, another transition metal element, was used in lieu of copper in the glass of Composition 8. Since iron can readily change its valence state when present in a glass, a comparison of its effect was made by adding 1 mole percent of $Fe_2O_3$ to the base glass used for Composition 5. Composition 8 corresponds essentially to Composition 5 except for $Fe_2O_3$ in lieu of CuO and the presence of 0.1% Si metal. Composition 8 is set forth in Table V and the heat schedule and the properties ascertained for the resulting glass-ceramic are set forth in Table VI. To ascertain if the state of oxidation of the iron could have a significant effect on the results, a portion of Composition 8 was remelted for 24 hrs. while oxygen was bubbled therethrough. The following chemical an analysis shows the effect of melting conditions on the oxidation state of the iron.

| | Weight Percent | | | |
|---|---|---|---|---|
| | $Fe_2O_3$ | FeO | Total as $Fe_2O_3$ | $FeO/Fe_2O_3$ |
| Composition No. 8 | 0.66 | 1.67 | 2.51 | 2.5 |
| Composition No. 8 (oxygenated) | 1.29 | 1.07 | 2.48 | 0.8 |

The $FeO/Fe_2O_3$ ratio was lowered by a factor of three due to the "oxygenation."

While the results show that Fe is not as effective as Cu in promoting an increase in the crystallization rates of the glasses in a reducing atmosphere, Fe does produce a fairly substantial compressive stress layer on the glass-ceramic surface albeit for a depth of no more than about 10 microns. Such glass-ceramics would be useful in making frangible products which will self-destruct by shattering into very small particles instead of large, jagged pieces.

TABLE V

| | (Weight Percent) Compositions | | | | | | |
|---|---|---|---|---|---|---|---|
| Ingredients | 8 | 9 | 10 | 11 | 12 | 13 | 14 |
| $SiO_2$ | 66.8 | 66.8 | 66.2 | 64.4 | 63.0 | 64.4 | 63.0 |
| $Al_2O_3$ | 20.6 | 21.0 | 21.2 | 25.0 | 24.5 | 25.0 | 24.5 |
| $Li_2O$ | 3.8 | 3.7 | 3.9 | 4.6 | 4.5 | 4.6 | 4.5 |
| $Na_2O$ | — | — | — | — | — | — | — |
| $TiO_2$ | 1.7 | 5.8 | — | — | — | — | — |
| $ZrO_2$ | 1.9 | — | 3.8 | — | — | — | — |
| CuO | — | 2.8 | 0.6 | 2.0 | 2.0 | 2.0 | 2.0 |
| $Cu_2O$ | — | — | 2.4 | — | — | — | — |
| CaO | 2.6 | — | — | — | — | — | — |
| $Fe_2O_3$ | 2.5* | — | — | — | — | — | — |
| (Si) | (0.1) | — | — | — | — | — | — |
| MgO | — | — | 2.0 | — | — | — | — |
| $SnO_2$ | — | — | — | 4.0 | 6.0 | — | — |
| $V_2O_5$ | — | — | — | — | — | 4.0 | 6.0 |
| Molar Ratio $Li_2O/Al_2O_3$ | 0.62 | 0.65 | 0.62 | 0.62 | 0.62 | 0.62 | 0.62 |
| Molar Ratio $SiO_2/Al_2O_3$ | 5.5 | 5.5 | 5.35 | 4.4 | 4.4 | 4.4 | 4.4 |
| Coeff. Thermal Expansion ×10⁻⁷ | 39.5 | 36.3 | 35.2 | 37.5 | 39.5 | 39.7 | 39.5 |

*Iron oxide expressed as $Fe_2O_3$

TABLE VI

| | HEAT-TREATMENT CONDITIONS: | | | | PROPERTIES | | |
|---|---|---|---|---|---|---|---|
| Comp. No. | Heating Rate (°C/hr.) | Holding Temp. °C. | Time (hrs/) | Forming Gas or Air | $\alpha \times 10^{+7}$ (0–300°C) | Comp. Stress psi × 10⁻³ | epth ($\mu$m) |
| 8 | 320 | 750 | 16 | F.G. | 0.9 | 15.0 | 10 |
| 8 | 320 | 775 | 2 | F.G. | 1.9 | 21.0 | 3 |
| 8* | 320 | 825 | 2 | F.G. | 0.4 | 33.0 | 5 |

*Glass remelted for 24 hours during which time oxygen gas was bubbled through the melt.

Examples 9 and 10 illustrate forming a compressive layer according to the invention in compositions containing either $TiO_2$ alone as a nucleant or $ZrO_2$ alone as a nucleant. Heat treatment conditions are given below in Table VIA.

TABLE VIA

| Comp. No. | Heating Rate (°C/hr) | Holding Temp. °C. | Time (hrs) | Atmospheric | $\alpha \times 10^7$ (0–300°C) |
|---|---|---|---|---|---|
| 9 | max. | 750 | 16 | F.G. | 7 |
| 10 | 320 | 850 | 1 | F.G. | 6 |

Other known nucleating agents were substituted for the $TiO_2$ and/or $ZrO_2$ in the glasses to ascertain their behavior. $SnO_2$ was used as a nucleant in the glasses of Examples 11 and 12. When heat treated at about 900°C., a low-expansion opaque body (−12 × 10⁻⁷) was produced which consisted primarily of a high-quartz solid solution phase plus a trace of cassiterite ($SnO_2$). Heat treatments at 950°C. or higher resulted in positive expansions. Neither glass could be crystallized by heat treating at 850°C. or lower temperatures for as long as 16 hours. Attempts to obtain surface stress data for these glasses failed because the samples exhibited no compressive stress layer or they shattered during the heat treatment.

Vanadium pentoxide ($V_2O_5$) was also used as a nucleating agent since it is known that the vanadium ions exist in four different valence states; namely, 2, 3, 4, and 5. Heat treatments made on glasses 13 and 14 indicated that the crystallization of the glasses can only be initiated from the surface. The rate of crystallization is very rapid since ¼ inch glass rod samples were fully crystallized in less than 1 hour. Due to the absence of bulk nucleation, samples heated in a hydrogen atmosphere produced either a tension layer on the surface or shattered. Also, a very high degree of shrinkage occurred during the heat treatment as a result of crystallization. It is quite apparent, therefore, that vanadium-nucleated glasses are not suitable for the reducing atmosphere-strengthening process of the present invention.

While applicant does not wish to be limited to any particular explanation as to the mechanism involved in forming compressive stress layers on glass-ceramic bodies by heat treating the thermally crystallizable glass containing a nucleating agent which can be reduced from a higher to a lower valence state and which is more effective at such lower valence state in a reducing atmosphere, it is believed that the mechanism is one of differential crystallization. Thus, by selecting a thermally crystallizable glass which can be thermally in situ crystallized to a glass-ceramic having a high quartz solid solution crystalline phase and having a much lower thermal expansion than that of the parent glass, a faster rate of nucleation can be induced in the surface and just below the surface of such glass-ceramic, resulting in a greater degree of crystallization in that nucleated area as compared to the interior of the glass-ceramic. Thus, a compressive stress layer is produced on the surface by the increased crystallization rate in and just below the glass surface, which increased rate results in a higher degree of crystallinity, up to 3 times or more, in the surface than in the interior of the glass-ceramic.

To show the relationship of the $Li_2O/Al_2O_3$ ratio in the thermally crystallizable glass compositions suitable for heat treating in a reducing atmosphere, the following glasses were prepared:

TABLE VII

| Ingredients | Compositions by Weight Percent | | | |
|---|---|---|---|---|
| | 15 | 16 | 17 | 18 |
| $SiO_2$ | 69.3 | 67.5 | 66.6 | 65.8 |
| $Al_2O_3$ | 21.4 | 20.8 | 20.6 | 20.3 |
| $Li_2O$ | 2.5 | 4.9 | 6.0 | 7.1 |
| $TiO_2$ | 1.8 | 1.8 | 1.8 | 1.8 |
| $ZrO_2$ | 2.0 | 2.0 | 2.0 | 2.0 |
| $CuO$* | 3.0 | 3.0 | 3.0 | 3.0 |

TABLE VII—Continued

| Ingredients | Compositions by Weight Percent | | | |
|---|---|---|---|---|
| | 15 | 16 | 17 | 18 |
| Molar Ratio $SiO_2/Al_2O_3$ | 5.5 | 5.5 | 5.5 | 5.5 |
| Molar Ratio $Li_2O/Al_2O_3$ | 0.4 | 0.8 | 1.0 | 1.2 |

*Copper oxide expressed as CuO.

Compositions 15 and 16 formed transparent glass-ceramics having a high quartz solid solution crystalline phase wherein the coefficient of thermal expansion is substantially lower than that of the parent glass and a compressive stress layer was readily formed on each surface to a substantial depth. Compositions 17 and 18 on heat treatment will not form transparent glass-ceramics of the type discussed above, and compressive stress layers cannot be formed thereon.

In the preferred embodiment of the invention, the thermal in situ crystallization process is an isothermal heat treatment wherein the thermally crystallizable glass is heated at a predetermined rate to a holding temperature and maintained at such temperature for the period of time necessary to have the desired compressive stress layer formed on the surface of the resulting transparent glass-ceramic to a depth of at least about 100 microns up to a depth of 400 to 500 microns or more. Of course, the coefficient of thermal expansion of the glass-ceramic should be within the range of from +12 to −12 × $10^{-7}$ (0°–300°C), and preferably within the range of from +6 to −6 × $10^{-7}$ (0°–300°C). The usually most preferred are those having a 0 ± 1 × $10^{-7}$ (0°–300°C) expansion coefficient, since these have the best thermal shock resistance.

| Comp No. | Heat Treatment Conditions | | | | Properties | | |
|---|---|---|---|---|---|---|---|
| | Heating Rate (°C/hr) | Holding Temp. °C. | Time (hrs) | Atmosphere | $\alpha \times 10^7$ (0–300°C) | Stress psi × $10^{-3}$ | Depth ($\mu$m) |
| 15 | 320 | 850 | 4 | F.G. | 4.1 | 30.2 C | 80 |
| 16 | max | 825 | 1 | $99N_2$ | −8.6 | 58.5C | 137 |

The thermally crystallizable glass can be subjected to a multistage heat treatment instead of the preferred isothermal heat treatment discussed above. However, it is critical, in order to develop the compressive stress layer on the surface of the resulting glass-ceramic to an appreciable depth, that the nucleating stage of the heat treating process be conducted in a reducing atmosphere. When nucleation occurs in an oxygen or air atmosphere no compressive stress layer is formed on the surface of the resulting glass-ceramic, even though the subsequent step of crystallization or crystal growth occurs in a reducing atmosphere.

Table VIII gives the expansion and stress data for a two-stage heat treatment and demonstrates that the nucleation phase of the process, which with these glasses occurred at 750°C., is significantly influenced by the heat treatment in the reducing atmosphere. Three of the first four glass samples in Table VIII were nucleated in a forming gas atmosphere at a holding temperature of 750°C, while one was nucleated in air at 750°C, for the times indicated in Table VIII and subsequently crystallized at the indicated temperatures in air for the times indicated. A heat-up rate of 320°C./hour was utilized to heat the glasses to the holding temperature.

To show that the finishing heat treatments were not solely responsible for the crystallization, separate samples were heated isothermally at the finishing tempera-

| Ingredient | Weight Percent |
|---|---|
| $SiO_2$ | 54 – 76 |
| $Al_2O_3$ | 18 – 33 |
| $Li_2O$ | 2 – 6.4 |
| Nucleating Agent | 3 – 8 |
| Copper Oxide (as CuO) | 0.5 – 6 |

TABLE VIII (All Glasses — Composition 5)

| Nucleation Time-Hours | Crystallization Heat Treatment Temp. °C. | Time-Hrs. | (0–300°C.) $\alpha \times 10^7$ | Comp. Stress (psi × $10^{-3}$) | Depth ($\mu$m) |
|---|---|---|---|---|---|
| 1 | — | — | 37.8 | 25.0 | 35 |
| 1 | 825 | 1 | –3.7 | 3.1 | 200 |
| 1* | 825 | 1 | 17.3 | —** | — |
| 1 | 850 | 1 | –7.1 | 24.0 | 145 |
| None | 825 | 1 | 38.7 | —** | — |
| None | 825 | 2 | 39.0 | —** | — |
| None | 850 | 1 | 38.7 | —** | — |
| None | 850 | 2 | 39.1 | —** | — |

* Glass nucleated in air instead of forming gas at 750°C.
** No compressive stress layer formed.

ture and above of the previous heat treatments. These are the last four samples listed in Table VIII. The expansion data obtained indicate that all such samples remained vitreous.

To further illustrate the effect of the reducing atmosphere during nucleation on compressive stress layer formation in the resulting product, a sample of Composition No. 5 glass was nucleated at 750° C. for 1 hour in air and finished at 825° C. for 1 hour, also in air. The expansion coefficient for this sample was 17.3 × $10^{-7}$/°C. (0°–300°C.), and no compressive stress layer was formed. What occurs when all conditions remain the same except that a reducing atmosphere is used, is seen in Table VIII, second glass-ceramic composition.

High-strength glass-ceramics of the present invention can be used in a variety of ways to make products wherein high mechanical strengths, good thermal shock resistance, and chemical durability are important, such as pipes for transporting chemicals and fluids, pumps and pump components, cookware, automobile and aircraft windshields and windows, deep submergence vessels, and the like. Because of the high compressive stress layer which can be formed, products formed of the glass-ceramics of the invention are frangible and can be made to self-destruct into harmless particles upon strong impact instead of breaking into several large, jagged pieces which could cause severe damage immediately after impact. Airplane canopies are examples of such frangible glass-ceramics. Work done with these glass-ceramics shows that they have corrosion resistance and chemical durability properties substantially equivalent to those glass-ceramics commercially used today.

Having defined the invention, what is claimed is:

1. A method of forming a transparent glass ceramic body having a compressive stress layer on the surface thereof and whereby there is imparted to said body a high mechanical strength of at least 20,000 psi and whereby said body when broken will shatter into very small particles instead of large, jagged pieces, said method consisting essentially of a. subjecting a thermally crystallizable glass body consisting essentially of the following composition:

wherein the molar ratio of $SiO_2/Al_2O_3$ is from 3 to 6, the molar ratio of $Li_2O/Al_2O_3$ is from 0.3 to about 0.9 and the nucleating agent is selected from the group consisting of $TiO_2$, $ZrO_2$ and mixture thereof and if $TiO_2$ or $ZrO_2$ is the sole nucleating agent it is present in an amount of from 3 to 6 percent and wherein at least 90 percent by weight of said body consists of said $SiO_2$, $Al_2O_3$, $Li_2O$, CuO and nucleating agent, to the nucleating temperature for said glass.

b. maintaining said glass body in a reducing atmosphere while subjecting it to said nucleating temperature for a period of time sufficient to increase the rate of nucleation in the surface of said glass body and said body has a higher degree of nucleation in its surface than in the interior thereof, and then c. further subjecting said glass body to a temperature sufficient to crystallize said body to a glass-ceramic having a higher degree of crystallization in and below the surface of the body than in the interior of said body, the portion of said glass ceramic body having a higher degree of crystallinity forming a compressive stress layer on the surface of said glass-ceramic body, to a depth of at least about 100 microns on the surface of said body said glass ceramic body having a coefficient of thermal expansion of from about +12 to −12 × $10^{-7}$/°C. (0°–300°C) said expansion coefficient being lower than that of the expansion coefficient of said glass body by 20 × $10^{-7}$/°C.

2. The method as defined in claim 1 wherein at least 95 percent by weight of said body consists of said $SiO_2$, $Al_2O_3$, $Li_2O$, CuO and nucleating agent and the remainder of the composition consists of compatible metal oxides which will not adversely affect the properties of the glass-ceramic.

3. The method as defined in claim 1 wherein said compressive stress layer is formed to a depth of from about 100 to 500 microns on the surface of said body.

4. The method as defined in claim 1 wherein the compressive stress in said surface layer is about 30,000 to 80,000 psi.

5. The method as defined in claim 1 wherein said reducing atmosphere is selected from the group consisting of mixtures of nitrogen and hydrogen, carbon monoxide, steam, natural gas and mixtures thereof.

6. A method as defined in claim 1 wherein the thermally crystallizable glass body consists essentially of the following composition

| Ingredient | Weight Percent |
|---|---|
| $SiO_2$ | 57 – 69 |
| $Al_2O_3$ | 20 – 31 |
| $Li_2O$ | 3 – 6 |
| Nucleating agent | 3 – 8 |
| Copper Oxide (as CuO) | 0.5 – 6 | wherein the molar ratio of $SiO_2/Al_2O_3$ is from 3.2 to 5.5 and the molar ratio of $Li_2O/Al_2O_3$ is from 0.4 to about 0.8 and the nucleating agent is selected from the group consisting of $TiO_2$, $ZrO_2$ and mixtures thereof.

7. The method as defined in claim 1 wherein said nucleating temperature is from about 750° to about 875°C.

8. The method as defined in claim 1 wherein said nucleating temperature and the temperature at which said crystallization occurs is substantially the same temperature.

9. The method as defined in claim 1 wherein said reducing atmosphere is a mixture of nitrogen and hydrogen.

10. The method as defined in claim 1 wherein said reducing atmosphere is steam.

11. The method as defined in claim 1 wherein said CuO is present in an amount of from about 1 to about 3.5 percent by weight.

* * * * *

UNITED STATES PATENT OFFICE
CERTIFICATE OF CORRECTION

PATENT NO. : 3,854,919
DATED : Dec. 17, 1974
INVENTOR(S) : Perry P. Pirooz

It is certified that error appears in the above-identified patent and that said Letters Patent are hereby corrected as shown below:

Col. 8, Table VI, under "Properties", last heading, "epth" should be ---Depth---.

Col. 10, Comp. No. 16, under the heading "Atmosphere", insert below "99$N_2$" --- 1$H_2$ ---.

Signed and Sealed this twenty-seventh Day of January 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,854,919
DATED : December 17, 1974
INVENTOR(S) : Perry P. Pirooz

It is certified that error appears in the above-identified patent and that said Letters Patent are hereby corrected as shown below:

Column 4, Table II, change "expansion x $10^{-7}$" to -- expansion x $10^7$ --.

Column 8, in Table V, change "expansion x $10^{-7}$" to -- expansion x $10^7$ --.

Signed and Sealed this

Fifteenth Day of November 1977

[SEAL]

Attest:

RUTH C. MASON
Attesting Officer

LUTRELLE F. PARKER
Acting Commissioner of Patents and Trademarks